(12) United States Patent
Yang

(10) Patent No.: US 7,736,074 B2
(45) Date of Patent: Jun. 15, 2010

(54) CARTRIDGE TYPE ATTACHMENT LENS FOR A DIGITAL CAMERA

(75) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 225 days.

(21) Appl. No.: 12/164,309

(22) Filed: Jun. 30, 2008

(65) Prior Publication Data
US 2009/0028547 A1    Jan. 29, 2009

(30) Foreign Application Priority Data
Jul. 27, 2007  (TW) .............................. 96212319 U

(51) Int. Cl.
*G03B 17/00* (2006.01)
*G03B 17/02* (2006.01)
*G02B 5/22* (2006.01)
*G02B 7/00* (2006.01)
*F21S 8/00* (2006.01)

(52) U.S. Cl. ....................... 396/529; 396/535; 359/892; 362/268

(58) Field of Classification Search ................. 396/529, 396/535
See application file for complete search history.

(56) References Cited

U.S. PATENT DOCUMENTS

| | | | | |
|---|---|---|---|---|
| 4,381,885 | A * | 5/1983 | Coquin | 359/892 |
| 4,443,061 | A * | 4/1984 | Coquin | 359/892 |
| 4,755,833 | A | 7/1988 | Tanigawa et al. | 347/176 |
| 5,541,686 | A | 7/1996 | Stephenson | 396/164 |
| 5,781,807 | A | 7/1998 | Glassgold et al. | 396/71 |
| 6,244,730 | B1 * | 6/2001 | Goldberg et al. | 362/268 |
| 6,341,201 | B1 * | 1/2002 | Ishiguro et al. | 396/56 |
| 6,742,943 | B2 * | 6/2004 | Ushiro | 396/529 |

* cited by examiner

*Primary Examiner*—Melissa J Koval
(74) *Attorney, Agent, or Firm*—Chun-Ming Shih

(57) ABSTRACT

A cartridge type attachment lens is arranged in front of a digital camera for receiving card lenses. A cuboid shaped shell is removably attached to a camera lens. A battery and a lighting unit as a light source for the close-up photography are in the shell. A plurality of parallel slots are each disposed on one lateral side of the shell, and each slot extends inwards to form a sliding groove in the shell for accommodating the card lens. Multiple card lenses can be inserted the shell to form arbitrary permutation and combination.

7 Claims, 3 Drawing Sheets

CARTRIDGE TYPE ATTACHMENT LENS FOR A DIGITAL CAMERA

BACKGROUND OF THE INVENTION

1. Field of the Invention

The present invention relates to a camera, and more particularly to an attachment lens for facilitating close-up photography in front of a camera lens.

2. Description of the Prior Art

Applications of digital cameras currently are very mature and popular so that they almost can have replaced conventional film cameras. As film cameras, digital cameras may be roughly divided into single lens reflex (SLR) cameras and compact cameras, wherein the latter ones are in the majority because of convenience, cheapness and easy operation. However, the compact cameras are equipped with a fixed (uninterchangeable) lens, which usually has a focal length of 35~105 mm (equivalent to 35 mm film camera) and a minimum focus distance of 50 cm. It can not satisfy the requirement of close-up photography or macrophotography. There may be some high level compact cameras that have so-called close-up photography function of 1 cm to 5 cm. However, they can only provide closer focusing distance instead of providing sufficient optical magnification. Therefore, it's not really capable of close-up photography (the ratio of an image size to an object size is at least 1:4). For the users with a demand on close-up photography, adding an attachment lens, which has a function of magnification, in front of a compact camera's original lens is necessary unless an expensive, heavy, and complicated SLR camera with a close-up lens and a close-up flash is adapted.

Currently, there are various attachment lenses on the market, such as U.S. Pat. Nos. 5,781,807, 5,541,686 and 4,755,833 etc. Those configurations are mainly to install a fixed magnifying lens or glass in front of the original camera lens, and further equipping with a secondary flash (as element 52 in '807) or adding a bent light guide cover (as element 35 in '838) on the original camera flash). However, such current attachment lenses only can provide a unitary and unvarying magnification. Users can't adjust the magnification depending on practical requirements. They at best can change the working distance ( a distance between a camera and a shot object ) to slightly adjust the magnification. However, the magnification only can be reduced below the predetermined maximum magnification by prolonging the working distance. The maximum magnification still can not be exceeded. Moreover, for some applied occasions of industrial and business photography, cameras and shot objects are usually fixed at a specific position to perform photographing largely and continuously. It's very inconvenient to change magnification by adjusting the working distance. Hence, such current attachment lenses should be further improved.

SUMMARY OF THE INVENTION

Accordingly, one object of the present invention is to provide a cartridge type attachment lens for digital cameras, which allow users to not only change lenses with different magnification, but also accommodate two or more lenses for various permutation and combination, so as to make different optical magnification in a fixed working distance.

In order to achieve the object mentioned above, the present invention includes a cuboid shell removably fixed on a camera lens, a battery disposed in the shell, and a lighting unit on the front side of the shell as a light source of the close-up photography. One lateral side of the shell has a plurality of parallel slots, and each slot extends to form a sliding groove inside the shell for accommodating a corresponding card lens. Moreover, an arbitrary permutation and combination can be achieved by inserting multiple lenses.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The above and further advantages of this invention may be better understood by referring to the following description, taken in conjunction with the accompanying drawings, in which.

Figure 1:
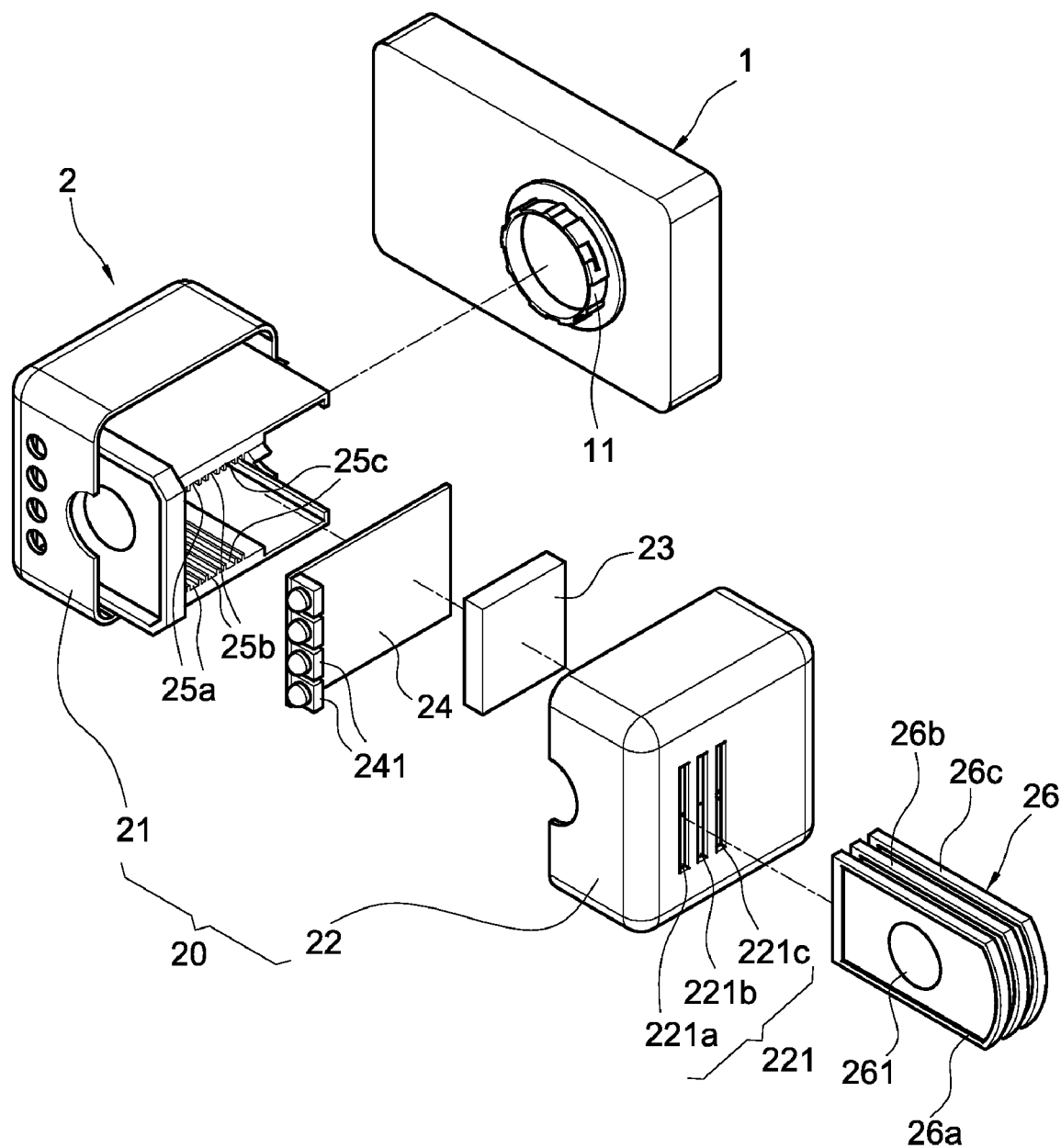
FIG. 1 is an exploded perspective view of the present invention.

The drawings will be described further in connection with the following detailed description of the present invention.

DETAILED DESCRIPTION OF THE PREFERRED EMBODIMENTS

Reference will now be made to the drawing figures to describe the present invention in detail.

With reference to FIG. 1, an exploded perspective view of the present invention is shown, an attachment lens 2 is removably connected on a fastening seat 11 which is mounted on a periphery of a camera 1 lens (not shown), so that an attachment lens 2 can be fixed in front of the lens. The attachment lens 2 mainly includes a shell 20, a battery 23, a lighting unit 24 and a plurality of card lenses 26. The shell 20 is preferably a cuboid as shown in the figures. But a skilled person in the art would know that the shape is not constrained, it can change depending on users' needs or artistic considering. The shell 20 is preferably composed of two corresponding half shells 21, 22. A battery 23 and a lighting unit 24 are disposed inside the shell 20. The battery 23 and the lighting unit 24 are electrically connected, and the power of the lighting unit 24 is supplied from the battery 23. Additionally, a switch (not shown) can be arranged to control the lighting unit 24. The light-emitting body 241 of the lighting unit 24, which is on the front side wall of the shell 20, can be a light emitting diode (LED) as a light source for the shot objects.

Figure 2:
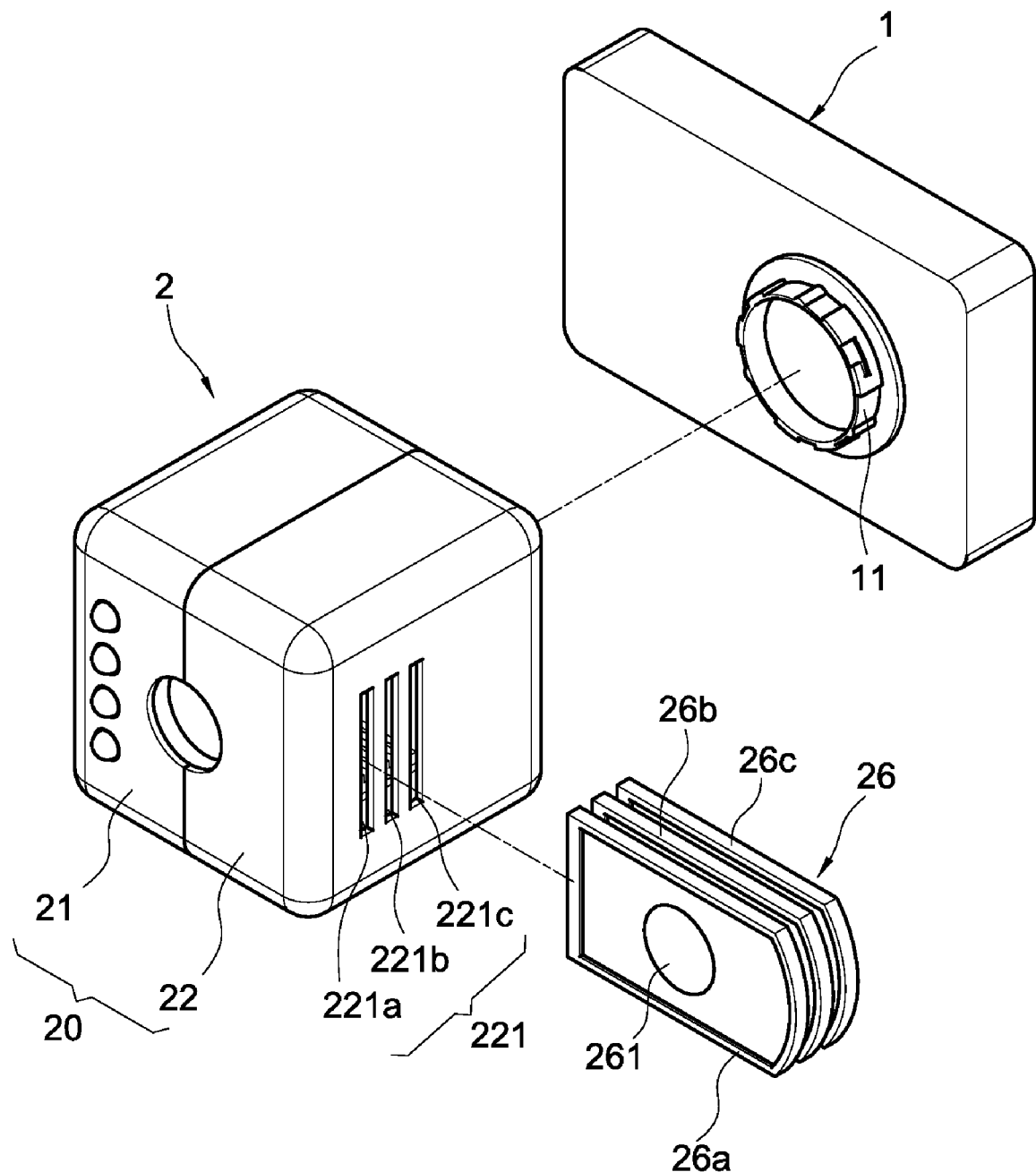
FIG. 2 is an assembled perspective view of the present invention.

With further reference to FIG. 1 and FIG. 2, one lateral side wall of the shell 20 is provided with one or more slots 26. One preferred embodiment as shown in FIG. 1 has three slots 221a~221c. In the embodiment of plural slots 221a~221c, the slots are parallelly arranged. Each slot 221a~221c is provided with a corresponding sliding groove 25a~25c in the shell 20. In other words, both each slot 221a~221c and its respectively corresponding sliding groove 25a~25c jointly form a narrow passage for allowing insertion of a card lens 26a~26c, and each passage is perpendicular to the light axis of the camera 1 lens. The card lenses 26a~26c have an outline corresponding to the slots 221a~221c and sliding grooves 25a~25c, respectively. And each card lens 26a~26c has an individual lens portion 261. As for the application of close-up photography, the lens portion 261 is basically a convex lens, but it can also be a plano-convex lens, biconvex lens, positive meniscus lens etc. Each kind of lenses can be provided with different optical magnification. Manufactures may provide various types of card lenses 26a~26c with different optical magnification and property to satisfy users.

Figure 3:
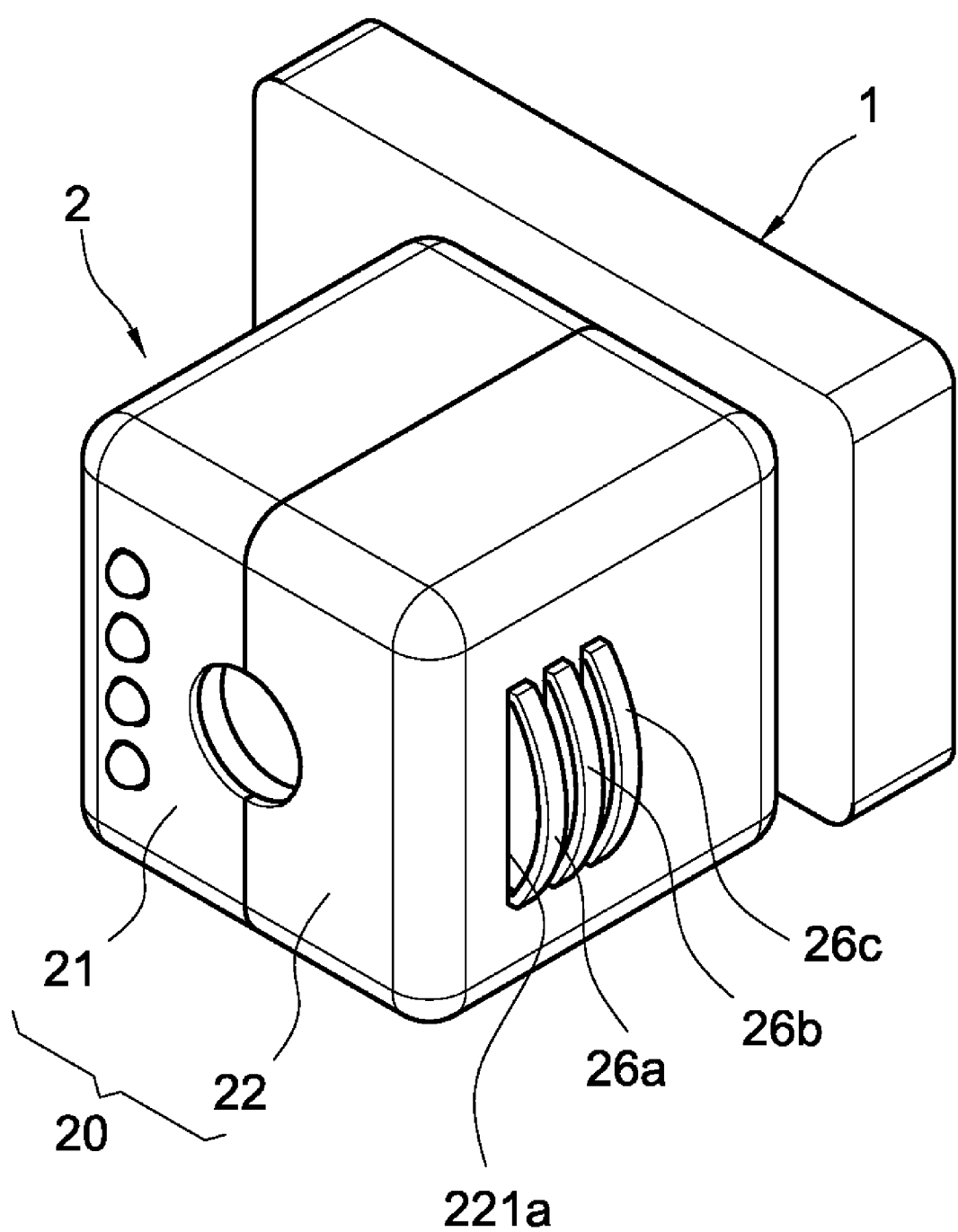
FIG. 3 is a schematic view showing the present invention is conjugated to a camera.

Portions of the interior and appearance of the shell 20, which relate to the optical path of the camera 1 lens, are hollowed out to prevent the light through the lens from being blocked. Once the card lenses 26a~26c are completely inserted into the sliding grooves 25a~25c along the slots 221a~221c, as shown in FIG. 3, the light axes of the lenses 261 of the card lenses 26a~26c and the camera 1 lens will just be in alignment. Thus the lens portion 261 will become a pre-lens of the camera 1 lens.

After the attachment lens 2 is fixed on the camera 1, users can change the card lenses 26a~26c arbitrarily, or use multiple card lenses 26a~26c at the same time to form any permutation and combination for required optical effect (optical magnification). It's very convenient to use.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A cartridge type attachment lens for a digital camera, comprising:
   a shell removably fixed in front of the camera for surrounding a camera lens, wherein one lateral side wall of the shell is provided with at least one slot, the at least one slot is provided with a corresponding sliding groove in the shell, both the slot and the sliding groove jointly form a passage, and the passage is perpendicular to the light axis of the camera lens; and
   at least one card lens which has a lens portion therein and an outline corresponding to the slot and the sliding groove for inserting into the passage, when the card lens is completely inserted into the passage, light axes of the lens portion of the card lens and the camera lens are just in alignment.

2. The cartridge type attachment lens in claim 1, further comprising
   a battery disposed in the shell; and
   a lighting unit disposed in the shell and electrically connected with the battery, a light-emitting body of the lighting unit being in front side of the shell.

3. The cartridge type attachment lens in claim 1, wherein the shell is composed of two corresponding half shells.

4. The cartridge type attachment lens in claim 2, wherein the shell is composed of two corresponding half shells.

5. The cartridge type attachment lens in claim 1, wherein the lens portion of the card lens is a convex lens.

6. The cartridge type attaching lens in claim 2, wherein the lens portion of the card lens is a convex lens.

7. The cartridge type attaching lens in claim 1, wherein the passage composed of the slot and the sliding groove is two or more in number.

* * * * *